Sept. 17, 1935. J. W. CHEWNING ET AL 2,014,556
METHOD AND APPARATUS FOR TREATING ACID SLUDGE
Filed March 24, 1933
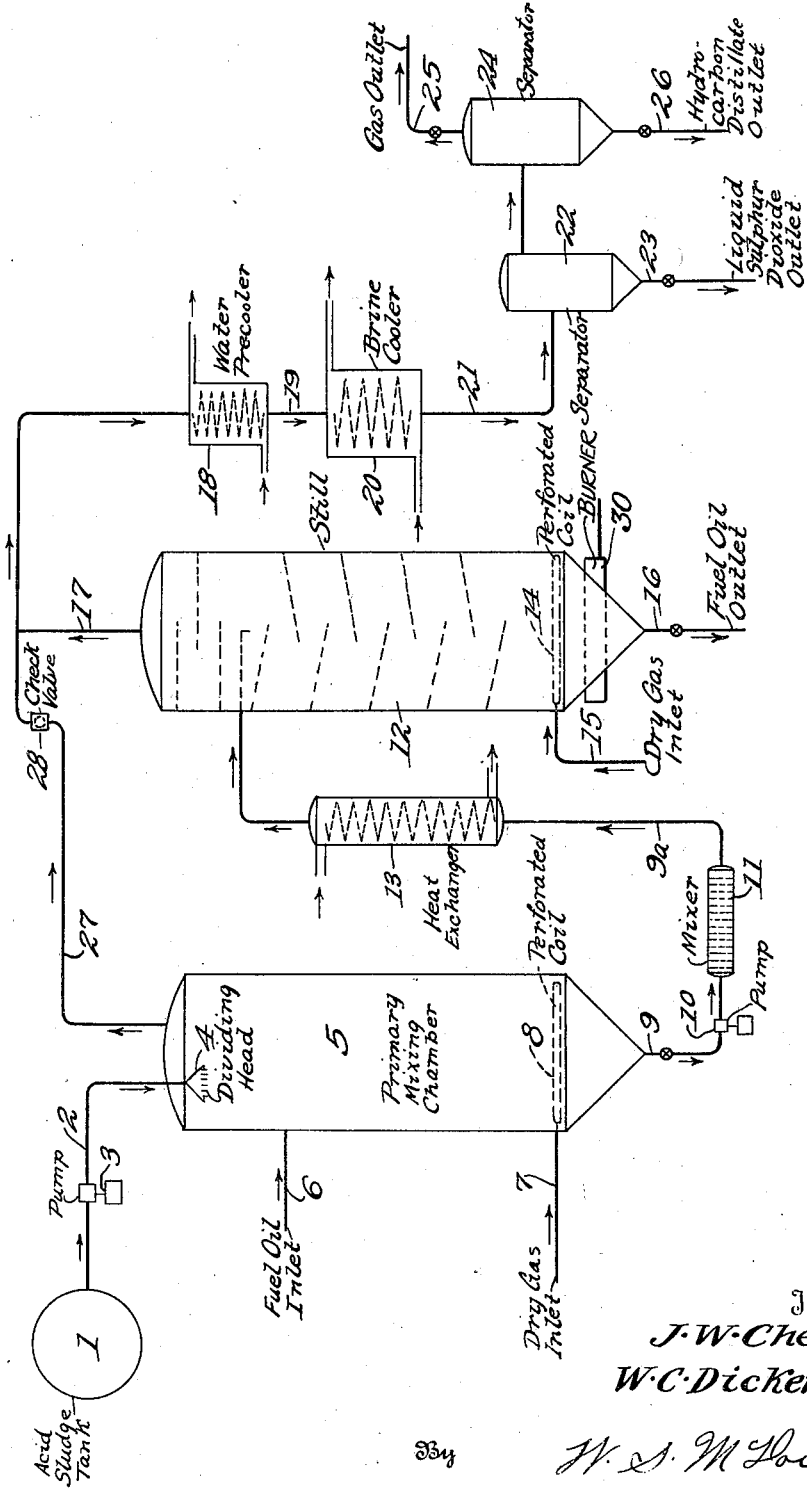
Inventors
J. W. Chewning
W. C. Dickerman, Jr.
By H. S. McDowell
Attorney Patented Sept. 17, 1935

2,014,556

UNITED STATES PATENT OFFICE 2,014,556

METHOD AND APPARATUS FOR TREATING ACID SLUDGE

James W. Chewning and William C. Dickerman, Jr., Chicago, Ill., assignors to The Pure Oil Company, Chicago, Ill., a corporation of Ohio Application March 24, 1933, Serial No. 662,558

15 Claims. (Cl. 196—148)

This invention relates to an improved method and apparatus for treating acid sludge produced as a waste product in the refining of petroleum oils, and it is a general object of the invention to provide for the economic disposal of such sludge and effect the recovery of more valuable products therefrom in the form of fuel oil or asphalt.

Acid sludge constitutes ordinarily a waste product in oil refining and the problem of its disposal, economic or otherwise, has been one of serious complexity. It is usually formed by treating hydrocarbon oils with commercial sulphuric acid to deprive the oils so treated of certain undesired compounds which interfere with and require exclusion in finished lubricating and other oils adapted for various practical uses. Such sludge consists primarily of a mixture of carbon and/or heavy hydrocarbons combined with sulpho-acids, and since it is copiously produced in commercial oil refineries, its disposal is a source of difficulty and expense.

It is, therefore, an outstanding object of our invention to provide an improved method and apparatus for treating such acid sludge with fuel oil and subjecting an intimate mixture of these ingredients to dry distillation, whereby to liberate acid from said mixture in the form of its decomposition products, leaving as a useful and valuable end product an improved fuel oil and/or asphalt possessing sufficient economic value to render the operation of the system profitable.

For a further understanding of the invention, reference is to be had to the following description and the accompanying drawing wherein the single figure illustrates diagrammatically apparatus employed for carrying out the ends of the present invention.

In the drawing, acid sludge obtained as a waste product from an oil treating process, is shown as contained in a working tank or accumulator 1. Leading from the tank 1 is a pipe line 2 provided with a pump 3 by means of which the acid sludge may be forced from the tank and delivered under pressure to a head 4, mounted within a primary mixing chamber 5. The head 4 is provided preferably at its outlet with thin spaced strips constituting knife edges, which function to divide extremely heavy sludge into thin strips. Heated fuel oil, preferably at a temperature of the order of from 150° F. to 200° F. is also pumped into the primary mixing chamber from a suitable source of supply by way of the pipe line 6, while hydrocarbon gases, or other suitable dry gases, enter the mixing chamber by way of the pipe line 7 and the perforated coil 8, the latter being arranged near the bottom of the mixing chamber, the gases being delivered to the mixing chamber in such volume as to secure effective agitation of the heated fuel oil and acid sludge. Thus the mixing chamber 5 serves as a proportioning tank for compounding the essential materials, namely, fuel oil and sludge, since the ratio and characteristics of which will influence greatly the characteristics of the main end products sought, to wit, asphalt or fuel oil.

A valved outlet line 9 extends from the bottom of the mixing chamber and is provided with a pump 10 for advancing the mixture of fuel oil and sludge through an orifice mixer 11 to further augment the intimacy of the fuel oil-sludge mixture. This mixture upon its discharge from the unit 11 is transferred through the pipe line 9a to the upper portion of a still 12. This still may be heated from any convenient source as for example, burner 30 or, if desired, a heat exchanger 13 may be placed around the line 9a to heat the fuel oil-sludge mixture prior to its delivery to the still 12. Dry hydrocarbon gases, or other suitable dry gases, enter the lower portion of the still 12 through the perforate coil 14 communicating with the pipe line 15. These gases are so distributed in the still as to vigorously agitate the sludge mixture passing through the still counter-currently to the flow of gases therethrough and react with said mixture to remove all sulphur dioxide and other acid vapors, together with such proportions of the lighter oil fractions as it may be found desirable to remove. Instead of using hydrocarbon gases in the still 12, specially prepared dry flue gases may be used advantageously and employed to serve as a source of heat for the still, as for instance, gases obtained from the combustion of hard coke. The temperature attained in the still 12 will depend on the characteristics of materials sought, but in general will range from 400 to 750° F.

Acid free asphalt or fuel oil is withdrawn from the bottom of the still 12 through the valved draw-off line 16 either continuously or intermittently, depending upon the manner of operating the process. The vapors which consist of a mixture of sulphur dioxide and petroleum distillates with added gases, pass through the overhead pipe line 17 to the water pre-cooler indicated at 18, and thence through the line 19 to a brine cooler indicated at 20, where the overhead products released from the still are cooled to 5° F., or lower, at which temperature sulphur dioxide is liquefied together with hydrocarbons, both light and heavy, as it may be desired to condense. The cooled mixture of liquids and gases pass through the line 21 to a separator 22, where the liquid sulphur dioxide is withdrawn through the outlet line 23 and delivered to any suitable apparatus. Gases and hydrocarbon liquids pass to the second separator 24, where the gas escapes to fuel lines or storage through the outlet 25 while the hydrocarbon distillate is withdrawn by way of the outlet 26.

Gases from the mixing chamber 5 pass through the overhead line 27 to the pipe line 17, a check valve 28 being placed in the line 27 to control the direction of flow at all times. It will be understood that any suitable fractionating device may be placed in the line 17 for the additional separation of the volatiles released from the still if desired.

The proportions of fuel oil to acid sludge used in the primary mixing chamber may vary between very wide limits depending on first, the spent acid and free acid content of the sludge to be treated, and second, the relative viscosity of the fuel oil used with reference to the viscosity of the fuel oil or asphalt sought as an end product. In general, the volume of fuel oil used will not be less than twice nor greater than ten times the volume of sludge used. Only relatively heavy fuel oils are now considered suitable for this purpose and they may be classed under Bunker Fuels "B" and "C" as given in Technical Paper 323B, United States Government Master Specifications. As an example we may use three volumes of Bunker "B" fuel with one volume of typical acid sludge obtained from treating Midcontinent residuum in the manufacture of "bright stocks" and conduct the operation so as to obtain a more viscous fuel falling into the Bunker "C" class; or optionally, we may use two volumes of the Bunker "C" fuel to one volume of sludge and conduct the process so as to obtain a light or medium grade asphalt.

The hydrocarbon gases employed in the primary mixer 5, and delivered thereto through the coil 8, are preferably typical stripped gases collected from refinery processes and may conform to the following analysis or vary from it widely in relative quantities of the following constituents:

| | Percent |
|---|---|
| Methane | 34.7 |
| Ethylene | 12.4 |
| Ethane | 27.1 |
| Propylene | 17.2 |
| Propane | 2.8 |
| Higher hydrocarbons | 5.8 |

Natural gas or producer gas might be used equally efficiently as long as these gases are substantially free from water vapor, since the gases used in the primary mixing chamber serve fundamentally for mixing purposes and therefore other inert dry gases might also be used.

Likewise, the same gases used in the primary mixing chamber 5 may be employed in the still 12 when they serve for mixing only. However, it is within the scope of the invention to employ a gas in the still 12 to serve the dual purpose of supplying the required heat while agitating the still contents and sweeping out vapors formed. For this purpose, a typical "air gas" may be obtained by passing a properly regulated stream of air through an incandescent bed of coke. Such an air gas might conform approximately to the following composition:

| | Percent |
|---|---|
| Methane | 0.4 |
| Hydrogen | 13.2 |
| Carbon monoxide | 25.3 |
| Carbon dioxide | 5.2 |
| Nitrogen | 55.2 |
| Oxygen | 0.6 |

It is obvious from the above analysis that "air gas" is a non-oxidizing gas.

In view of the foregoing, it will be seen that the present invention provides a process for economic acid sludge disposal designed purposely to impart sufficient flexibility in method and control of operation so that the maximum yield of whatever end products happen to be the most valuable from a commercial standpoint may be obtained. Ordinarily, the process is operated to obtain fuel oil rather than asphalt but for purposes of defining the scope of the present invention, these terms are employed in overlapping sense. It will be noted that one of the outstanding features of the present invention is the employment of dry distillation in the still 12 thus eliminating the use of steam. The use of the dry gases simultaneously agitates the materials passing through the still and removes the decomposition products of the sulpho-acids originally present in such materials. Thus the present invention provides a practicable method of securing the necessary agitation and proper mixing of fuel oil and sludge while, at the same time, removing and recovering decomposition products through dry distillation.

What is claimed is:

1. The method of utilizing acid sludge produced in the refining of hydrocarbon oils, which comprises passing an intimate mixture composed of such acid sludge and fuel oil through a closed distillatory zone wherein said mixture is heated to a temperature of the order of 400 to 750° F., removing acid from said mixture in the form of decomposition products by passing substantially dry, inert gas which is incondensable at normal temperatures and pressures therethrough to agitate said mixture and remove said decomposition products, removing volatiles of such distillation from the upper portion of said zone, and removing from the lower portion of said zone asphalt or improved fuel oil.

2. The method of utilizing acid sludge to recover valuable products therefrom, which comprises producing an intimate mixture of acid sludge and fuel oil wherein the volume of fuel oil used is not less than twice nor greater than ten times the volume of acid sludge, subjecting said mixture to gaseous and mechanical agitation to augment the intimacy of the mixture removing acid from said mixture in the form of its decomposition products by subjecting said mixture while in a confined distillation zone to temperatures of the order of 400 to 750° F., and in the absence of water vapor, simultaneously passing substantially dry, inert gas which is incondensable at normal temperatures and pressures therethrough to agitate said mixture and remove said decomposition products, whereby to produce a residuum in said distillation zone composed of improved fuel oil or asphalt.

3. In the recovery of valuable products from an acid sludge fuel oil mixture, the step which consists in passing a substantially dry, inert gas which is incondensable at normal temperatures and pressures through such a mixture while the latter is contained in a distillation zone to simultaneously heat said mixture to a temperature of the order of 400 to 750° F., whereby to agitate said mixture and remove therefrom decomposition products of its acid content.

4. In a process for utilizing acid sludge to recover valuable products therefrom, the step which consists in passing a stream of pre-heated air gas obtained by passing a properly regulated stream of air through an incandescent bed of coke through a mixture of acid sludge and fuel oil while the latter is passing through a closed distillation zone counter-currently to the flow of air gas therethrough, whereby to heat said mixture to temperatures of distillation ranging from 400 to 750° F. and remove therefrom volatiles and acid decomposition products, and reducing said mixture to the form of an improved fuel oil or asphalt.

5. The method of treating acid sludge to obtain valuable products therefrom, which comprises combining with one part of such acid sludge two to ten parts of fuel oil pre-heated to a temperature of the order of 150 to 200° F. while said ingredients are maintained in a primary mixing zone, passing hydrocarbon gases through the mixture of heated fuel oil and acid sludge while in said mixing zone to agitate said mixture, withdrawing the mixture from the lower region of said zone and advancing the same in stream formation through an orifice mixer to additionally agitate said mixture and increase the intimacy thereof, then delivering the mixture to the upper region of a baffled distillation zone for substantially downward travel in a tortuous path through said distillation zone, heating the mixture while in said distillation zone to temperatures of the order of 400 to 750° F., simultaneously passing substantially dry gases upwardly through said distillation zone in counter-current contact with the descending mixture, whereby to remove volatiles and acid decomposition products from said mixture and reduce the latter in the lower portion of said distillation zone to a state of improved fuel oil or asphalt.

6. The process for utilizing acid sludge comprising: producing an intimate mixture of such sludge and fuel oil, introducing said mixture into the upper portion of a baffled distillation zone for downward gravitational travel therethrough in a substantially tortuous path, introducing into the lower region of said zone a substantially dry pre-heated gas obtained by the regulated passage of air through an incandescent bed of coke, whereby to bring said gas into counter-current contact with said mixture during the descent of the latter through said zone in order to heat said mixture to a temperature of the order of 400 to 750° F., to remove volatiles and acid decomposition products therefrom, condensing and refrigerating said volatiles and decomposition products and separating the same to recover liquid $SO_2$, hydrocarbon gas and a hydrocarbon distillate in a separated state, and removing as a desired end product from the lower region of said distillation zone asphalt or fuel oil.

7. In a process for effecting the disposal of acid sludge, the steps which comprise: producing an intimate mixture of acid sludge and pre-heated fuel oil wherein the fuel oil is preponderantly present, subjecting said mixture to effective agitation, introducing the agitated mixture into the upper portion of a substantially closed distillation zone for downward travel in a substantially tortuous course through said zone, heating the mixture during its travel through said zone to temperatures of the order of 400 to 750° F. while in the absence of water vapor, introducing into the lower portion of said zone a substantially dry non-aqueous inert gas and bringing such gas into counter-current contact with the descending mixture passing generally downwardly through said zone, whereby to remove volatiles and acid decomposition products from said mixture and reducing the latter to a state of fuel oil or asphalt for withdrawal from the lower portion of said zone, removing the volatiles and decomposition products from the upper region of said zone, and refrigerating and fractionating the same to recover in a separate state liquid $SO_2$ and hydrocarbons.

8. A system for utilizing acid sludge comprising a primary mixer, means for introducing acid sludge and fuel oil into said mixer, means for agitating said mixture while in said mixer with gas, a still, a pipe line extending from the lower portion of said mixer to the upper portion of said still, a pump in said pipe line, an orifice mixer in said pipe line for further agitating said mixture during transference thereof from the mixer to said still, baffles arranged in said still below the mixture inlet, means for heating said mixture during its passage through said still, means for introducing a gas into the lower portion of said still for agitating contact with said mixture during its substantially downward passage through said still over the baffled surfaces of the latter, a draw-off line connected with the bottom of said still for removing asphalt or fuel oil therefrom, and an overhead vapor line communicating with the upper portion of said still for removing volatiles therefrom.

9. A system for recovering valuable products from acid sludge comprising: a primary mixer, means for introducing acid sludge and means for introducing fuel oil in regulated proportions into said mixer, means disposed in said mixer for effecting initial agitation of said mixture, a still, a pipe line leading from the lower portion of said mixer to substantially the upper portion of said still, a pump arranged in said pipe line, a secondary mixer disposed in said pipe line for additionally agitating said mixture during transference thereof from said primary mixer to said still, means for maintaining said mixture at distillation temperatures during substantially downward travel thereof through said still, means for introducing a substantially dry gas into the lower portion of said still for counter-current contact with said mixture during the descent of the latter through the still, a draw-off line communicating with the bottom of said still for removing asphalt or fuel oil produced by the distillation of said mixture, a vapor line leading from the upper portion of said still for removing the volatiles of such distillation including acid decomposition products, and means for condensing and recovering said volatiles and decomposition products.

10. In apparatus for treating acid sludge, a primary mixer comprising a closed vessel, a pipe line for introducing acid sludge in regulated quantities into said mixer, said pipe line terminating within said mixer in a head provided with spaced shredding knives, a second pipe line communicating with the interior of said mixer for introducing fuel oil in regulated quantities into said mixer, a pipe line entering the lower portion of said mixer for introducing gas into said mixer to agitate and commingle the fuel oil and acid sludge, a gas draw-off line communicating with the upper portion of said mixer, and a mixture draw-off line communicating with the lower portion of said mixer.

11. In a system for utilizing acid sludge, a primary mixer, means for introducing regulated quantities of acid sludge and means for introducing fuel oil into said primary mixer, a still, a pipe line connecting the lower portion of said mixer with substantially the upper portion of said still, pump means for advancing said mixture through said pipe line, a secondary mixer arranged in said pipe line to effect further commingling of the ingredients of said mixture, means for heating the mixture during substantially downward travel of the latter through said still, means for introducing a substantially dry gas into the lower portion of said still for counter-current contact with the descending mixture, a vapor draw-off line communicating with the upper portion of said still, and a draw-off line communicating with the lower portion of said still for effecting the removal of asphalt or fuel oil formed in said still.

12. In a system for utilizing acid sludge, a primary mixer, means for introducing regulated quantities of acid sludge and means for introducing fuel oil into said primary mixer, a still, a pipe line connecting the lower portion of said mixer with substantially the upper portion of said still, pump means for advancing said mixture through said pipe line, a secondary mixer arranged in said pipe line to effect further commingling of the ingredients of said mixture, means for heating the mixture during substantially downward travel of the latter through said still, means for introducing a substantially dry gas into the lower portion of said still for counter-current contact with the descending mixture, a vapor draw-off line communicating with the upper portion of said still, a draw-off line communicating with the lower portion of said still for effecting the removal of asphalt or fuel oil formed in said still, and means for condensing and fractionating the volatiles removed from the upper portion of said still through said vapor line.

13. In a system for utilizing acid sludge, a primary mixer, means for introducing regulated quantities of acid sludge and means for introducing fuel oil into said primary mixer, a still, a pipe line connecting the lower portion of said mixer with substantially the upper portion of said still, pump means for advancing said mixture through said pipe line, a secondary mixer arranged in said pipe line to effect further commingling of the ingredients of said mixture, means for heating the mixture during substantially downward travel of the latter through said still, means for introducing a substantially dry gas into the lower portion of said still for counter-current contact with the descending mixture, means for preheating the dry gas prior to its introduction into the lower portion of said still, a vapor draw-off line communicating with the upper portion of said still, a draw-off line communicating with the lower portion of said still for effecting the removal of asphalt or fuel oil formed in said still, and means for condensing and fractionating the volatiles removed from the upper portion of said still through said vapor line.

14. In a process of utilizing acid sludge, the steps which comprise mixing the sludge with a relatively heavy oil, contacting the mixture with hot dry, inert gas which is incondensable at normal temperatures and pressures whereby to decompose the sulphur compounds and distill off light ends, cooling the resulting vapors to a temperature sufficiently low to liquefy sulphur dioxide at atmospheric pressure and separating the condensed vapors and the uncondensed gases from the sulphur dioxide.

15. A system for utilizing acid sludge comprising a primary mixer, means for introducing acid sludge and means for introducing fuel oil into said mixer, means for agitating said mixture in said mixer by means of a gas, a still, a connection from the lower portion of said mixer to the upper portion of said still, means for pumping the mixture through said connection, baffles in said still below the connection thereto, means for heating said mixture during its passage through said still, said means including means for introducing a gas into the lower portion of the still, a draw-off line connected with the bottom of said still and a vapor off-take connected to the upper portion thereof.

JAMES W. CHEWNING.
WILLIAM C. DICKERMAN, Jr.